United States Patent
Ripley

(10) Patent No.: US 7,440,841 B2
(45) Date of Patent: Oct. 21, 2008

(54) METHOD OF EFFICIENTLY DETERMINING PRESSURE-BASED COMBUSTION PARAMETERS FOR AN IC ENGINE

(75) Inventor: Eugene V. Ripley, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 33 days.

(21) Appl. No.: 11/652,898

(22) Filed: Jan. 12, 2007

(65) Prior Publication Data

US 2008/0172199 A1    Jul. 17, 2008

(51) Int. Cl.
  G06F 17/00    (2006.01)
  F02M 7/00    (2006.01)
(52) U.S. Cl. .................. 701/111; 123/299; 123/435
(58) Field of Classification Search .......... 701/102, 701/103, 110, 111, 114; 123/435, 436, 316; 73/116, 117.1, 35.09
See application file for complete search history.

(56) References Cited

U.S. PATENT DOCUMENTS

| | | | |
|---|---|---|---|
| 5,107,813 A * | 4/1992 | Inoue et al. ............ | 123/406.22 |
| 5,831,263 A * | 11/1998 | Komachiya et al. .... | 250/227.17 |
| 6,560,526 B1 * | 5/2003 | Matekunas et al. .......... | 701/104 |
| 6,810,320 B2 * | 10/2004 | Yamamoto et al. .......... | 701/111 |
| 6,889,664 B2 * | 5/2005 | Worth et al. ................. | 123/494 |
| 6,993,427 B2 * | 1/2006 | Ueda .......................... | 701/111 |
| 7,107,140 B2 * | 9/2006 | Yoshino et al. ............. | 701/102 |
| 7,171,950 B2 * | 2/2007 | Palma et al. ................ | 123/435 |
| 7,222,606 B2 * | 5/2007 | Yoshino et al. ........ | 123/406.37 |

* cited by examiner

*Primary Examiner*—Willis R. Wolfe, Jr.
*Assistant Examiner*—Johnny H. Hoang
(74) *Attorney, Agent, or Firm*—Jimmy L. Funke

(57) ABSTRACT

Pressure-based combustion parameters of an IC engine are determined based on engine cylinder pressure measurements and crank angle dependent cylinder volume data, where the pressure in a given engine cylinder is periodically sampled at scheduled crank angles to provide a measurement resolution that varies over the combustion cycle for that cylinder, and the cylinder volume data is retrieved from a table of pre-calculated data. The combustion parameter calculations are customized to suit the variable resolution pressure data, and the crank angles used to retrieve the pre-calculated cylinder volume data are offset from the scheduled crank angles to compensate for misalignment of the pressure measurements relative to the scheduled engine crank angles.

6 Claims, 4 Drawing Sheets

METHOD OF EFFICIENTLY DETERMINING PRESSURE-BASED COMBUSTION PARAMETERS FOR AN IC ENGINE

TECHNICAL FIELD

The present invention relates to analyzing combustion events in an IC engine, and more particularly to a method of determining combustion parameters based on engine cylinder pressure measurements.

BACKGROUND OF THE INVENTION

The combustion events in an IC engine can be analyzed on a real-time basis for purposes of diagnosing and/or controlling the engine operation. Several useful combustion parameters, including the indicated mean effective pressure (IMEP), the pumping mean effective pressure (PMEP) and the net heat release energy ($Q_{net}$), can be calculated based on engine cylinder pressure measurements and corresponding cylinder volume data. These combustion parameters can be used to detect combustion irregularities in a given cylinder and to detect cylinder-to-cylinder imbalances.

The pressure-based combustion parameters for a given cylinder are ordinarily determined by periodically measuring the cylinder pressure with a suitably placed pressure sensor, calculating cylinder volume data for each pressure measurement based on crankshaft position (also referred to herein as crank angle), and calculating the combustion parameters based on the measured pressures and the calculated cylinder volume data. However, calculating the combustion parameters with sufficient resolution requires an enormous computational effort, and it can be difficult to accurately associate individual pressure measurements with corresponding cylinder volume data. What is needed, therefore, is a method of more efficiently determining pressure-based engine combustion parameters with an on-board engine controller.

SUMMARY OF THE INVENTION

The present invention provides an improved method of determining pressure-based combustion parameters of an IC engine based on engine cylinder pressure measurements and crank angle dependent cylinder volume data, where the pressure in a given engine cylinder is periodically sampled at scheduled crank angles to provide a measurement resolution that varies over the combustion cycle for that cylinder, and the cylinder volume data is retrieved from a table of pre-calculated data. This relieves the computational burden of determining the pressure-based combustion parameters, while providing sufficient resolution during critical portions of the combustion cycle. The combustion parameter calculations are customized to suit the variable resolution pressure data, and the crank angles used to retrieve the pre-calculated cylinder volume data are offset from the scheduled crank angles to compensate for misalignment of the pressure measurements relative to the scheduled engine crank angles.

DESCRIPTION OF THE PREFERRED EMBODIMENT

Figure 1:
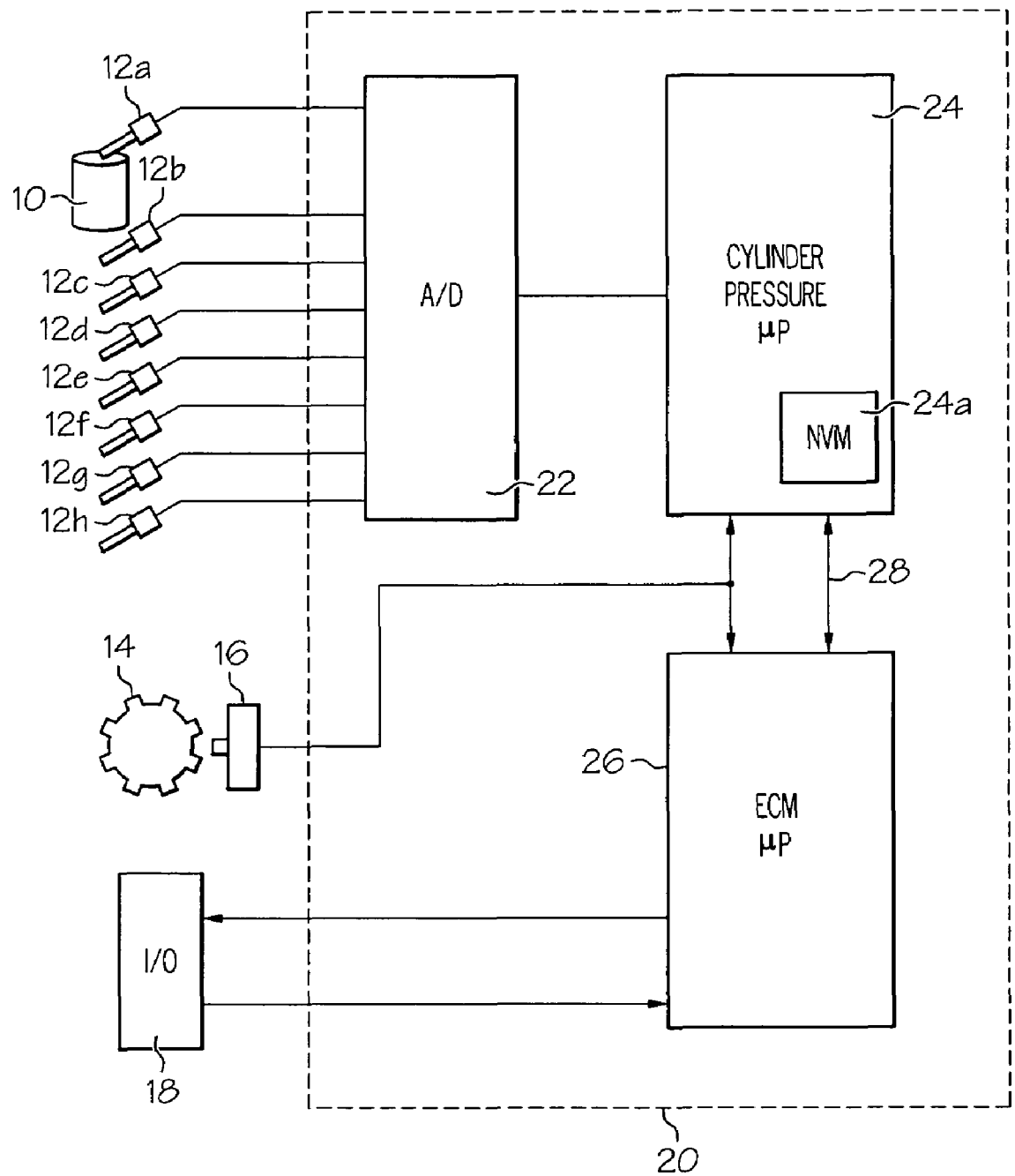
FIG. 1 is a block diagram of an IC engine and a microprocessor-based system for carrying out the method of this invention.

Referring to the drawings, FIG. 1 depicts an implementation of the present invention for an eight-cylinder IC engine. It is assumed that the engine is a four-stroke engine, although the invention can also be applied to a two-stroke engine. The engine is represented in FIG. 1 by the components 10-18, and is controlled by a microprocessor-based engine control module (ECM) 20. The reference numeral 10 designates a representative cylinder of the engine, and the reference numeral 12a designates a pressure sensor (a piezoelectric sensor, for example) positioned to detect the pressure inside cylinder 10. The additional pressure sensors 12b, 12c, 12d, 12e, 12f, 12g, 12h are provided for detecting the pressure in the remaining seven cylinders which are not shown in FIG. 1. The pressure sensors 12a-12h produce analog signals corresponding to the detected pressures, and these analog signals are supplied to an eight-channel high-speed analog-to-digital converter 22 within ECM 20. Other depicted engine components include a toothed wheel 14 coupled to the engine crankshaft, an encoder 16, and an I/O block 18. The encoder 16 may be a Hall-Effect or variable reluctance sensor, for example, and is positioned to detect passage of the teeth of wheel 14 as it rotates with the engine crankshaft to provide (along with a cam or sync pulse signal) an absolute measure of the engine crank angle. The I/O block 18 designates the usual complement of engine sensors and actuators, including for example, a manifold absolute pressure sensor, fuel and spark timing actuators, and so on.

The ECM 20 of FIG. 1 is a dual-processor configuration, including a first microprocessor (µP) 24 for determining pressure-based engine combustion parameters and a second µP 26 for carrying out an engine control based in part on the determined combustion parameters. A data bus 28 couples µP 24 and µP 26 to support inter-processor data transfer. The cylinder pressure data digitized by A/D converter 22 is supplied to µP 24, and the components represented by I/O block 18 are coupled to µP 26. The encoder 16 produces a digital pulse train (generally referred to as a crank signal) that is supplied to both µP 24 and µP 26. It will be appreciated that other ECM configurations are possible, even though the configuration of FIG. 1 is described as the preferred embodiment.

Figure 2:
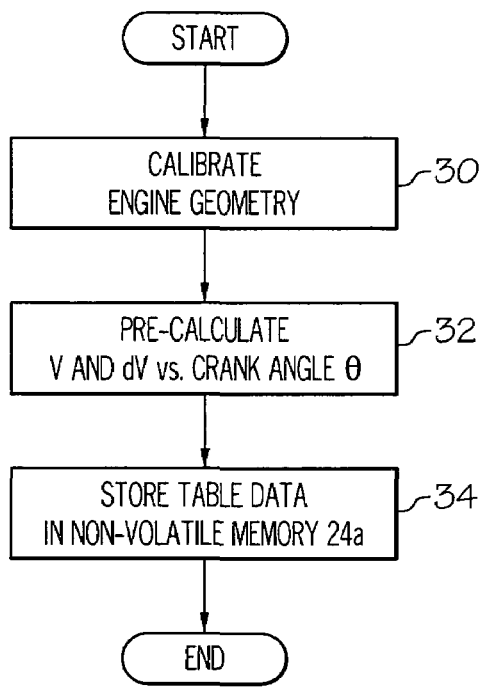
FIG. 2 is a flow diagram representing a first off-line process for pre-calculating crank angle dependent engine cylinder volume data and storing the data in the microprocessor-based system of FIG. 1.
Figure 3:
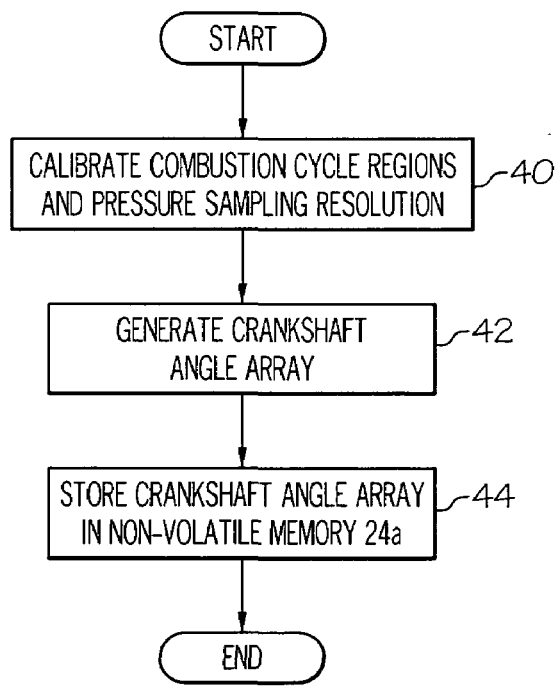
FIG. 3 is a flow diagram representing a second off-line process for scheduling engine crank angles for cylinder pressure measurement.

The flow diagrams of FIGS. 2 and 3 represent two off-line processes for developing data used for real-time determination of pressure-based combustion parameters according to this invention. The flow diagram of FIG. 2 represents a process for pre-calculating crank angle dependent engine cylinder volume data, while the flow diagram of FIG. 3 represents a process for scheduling the engine crank angles for cylinder pressure sampling.

Figure 4:
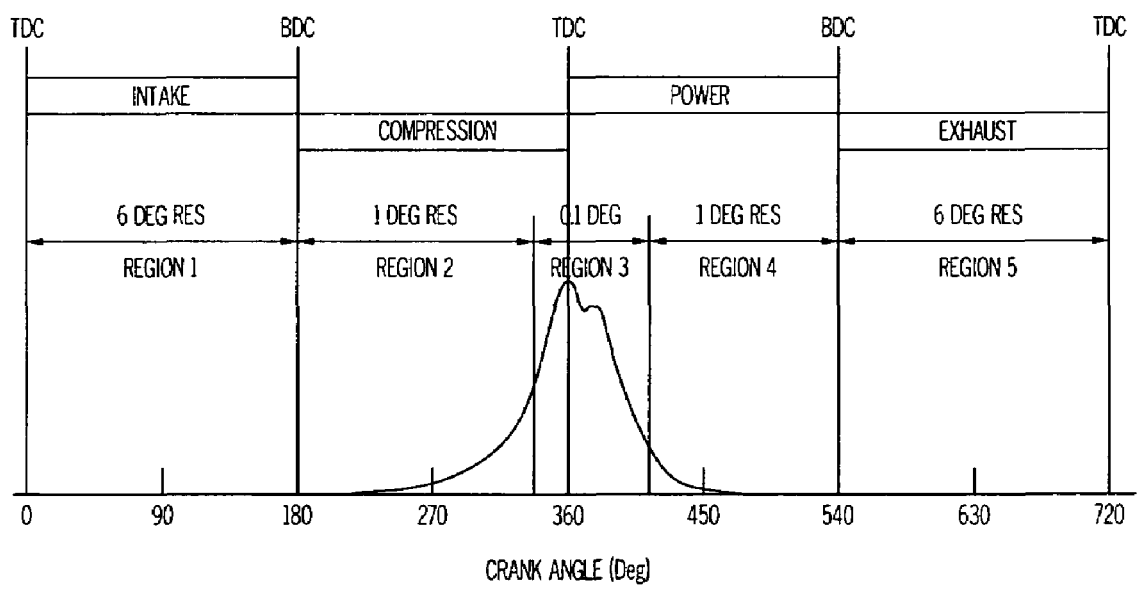
FIG. 4 is a graph of pressure vs. crank angle for a given cylinder of an IC engine, and illustrates the variable resolution pressure measurement of this invention.

FIG. 4 graphically depicts the pressure in a given cylinder as a function of crank angle over a complete four-stroke combustion cycle. In the illustrated convention, the cycle begins at 0° (relative) with the onset of the intake stroke and ends 720° later with the conclusion of the exhaust stroke. For control purposes, the combustion cycle is partitioned into five regions or zones, designated in FIG. 4 as Region 1 through Region 5. Region 1 comprises the entire intake stroke, Region 2 comprises the initial portion of the compression stroke, Region 3 comprises critical portions of the compression and power strokes in which the combustion event occurs, Region 4 comprises the remainder of the power stroke, and Region 5 comprises the entire exhaust stroke.

Three combustion parameters of interest for engine control purposes are the indicated mean effective pressure (IMEP), the pumping mean effective pressure (PMEP), and the net heat release energy ($Q_{net}$). In general, both IMEP and PMEP can be expressed as:

$$IMEP, PMEP = (1/Vd) \int (P \, dV) \quad (1)$$

where Vd is the displaced volume of the cylinder, P is the measured cylinder pressure, and dV is the rate of change in cylinder volume at the point in the engine cycle where the pressure P was measured. For IMEP, the (P*dV) products are integrated over 360° of crankshaft rotation centered about the combustion event (i.e., over Regions 2, 3 and 4 of FIG. 4). For PMEP, the (P*dV) products are integrated over the opposite 360° of crankshaft rotation (i.e., over Regions 1 and 5 of FIG. 4). On the same level, Qnet can be expressed as:

$$Qnet = \int [(\gamma/(\gamma-1))](P \, dV) + \int [(1/(\gamma-1))](V \, dP) \quad (2)$$

where $\gamma$ is a ratio of specific heats $c_p$ and $c_v$ (which may be estimated during engine operation for a given cylinder as a function of that cylinder's temperature, pressure and air/fuel ratio), dP is the rate of change in cylinder pressure, and V is the cylinder volume corresponding to the pressure rate of change dP. Thus, the volume terms V and dV are needed to calculate the desired combustion parameters IMEP, PMEP and $Q_{net}$.

As indicated by flow diagram blocks 30, 32 and 34 of FIG. 2, the crank angle dependent volume terms V and dV are pre-calculated off-line for a given engine family and then stored in the format of a look-up table (with crank angle as the independent variable) in non-volatile memory 24a of μP 24. The volume terms are calculated at a fine crank angle resolution of 0.01° to 0.10°, as the capacity of non-volatile memory 24a permits. As explained below, this allows the volume data look-up functions to be precisely offset from the scheduled crank angles to compensate for misalignment of the actual pressure measurements relative to scheduled crank angles.

The terms V and dV are calculated for a given crank angle based on engine geometry dimensions such as the cylinder bore and stroke, the connecting rod length, and so on. Specifically, the volume $V_i$ for a given crankshaft angle $\theta_i$ is calculated as follows:

$$V_i = V_C + \frac{\pi B^2}{4}\left[L_{ROD} + \frac{L}{2} - \left(\frac{L}{2}\cos(\theta_i) + \left(L_{ROD} * \cos\left(a\sin\left(\frac{\frac{L}{2}\sin(\theta_i) + wp}{L_{ROD}}\right)\right)\right)\right)\right] \quad (3)$$

where B is the bore, L is the stroke, $L_{ROD}$ is the connecting rod length, wp is the wrist pin offset, and $V_C$ is the clearance volume. The clearance volume $V_C$ can be calculated as:

$$V_C = V_d/(CR-1) \quad (4)$$

where CR is the compression ratio and $V_d$ is the displaced volume (a function of bore B and stroke L). The change in volume $V_i$ for a given crankshaft angle $\theta_i$—that is, $$\left[\frac{dV}{d\theta}\right]_i$$

—is calculated as follows:

$$\left[\frac{dV}{d\theta}\right]_i = \frac{\pi B^2}{4}\left[\frac{L}{2}\sin(\theta_i) + \frac{\left(\frac{L}{2}\sin(\theta_i) + wp\right) * \frac{L}{2}\cos(\theta_i)}{L_{ROD}\left[1 - \frac{\left(\frac{L}{2}\sin(\theta_i) + wp\right)^2}{L_{ROD}^2}\right]^{0.5}}\right] \quad (5)$$

The flow diagram of FIG. 3 represents a second off-line process for generating an array of engine crank angles identifying the desired pressure measurement points for each of the engine cylinders. According to the method of present invention, the engine cylinder pressure is measured at a variable resolution to relieve the calculation burden of μP 24 without degrading the required computational accuracy. The graph of FIG. 4 shows one possible sampling schedule in which the 720° of crankshaft rotation per engine cycle is divided into five regions, as explained above. For purposes of calculation accuracy, the critical portions of the cycle are those in which the pressure is rapidly changing. Accordingly, the pressure measurement resolution is scheduled appropriate to each region. In the least critical Regions 1 and 5, the pressure is sampled every 6° of crankshaft rotation; in the more critical Regions 2 and 4, the pressure is sampled every 1° of crankshaft rotation; and in the most critical Region 3, the pressure is sampled every 0.1° of crankshaft rotation. Preferably, the number of regions, their duration, and the sampling resolution for each, are calibrated off-line as indicated by block 40 of FIG. 3. As indicated at block 42, the calibrated resolution parameters are then used to create an array of crankshaft angles corresponding to the desired pressure sampling points. For the example of FIG. 4, the crankshaft angle array can be given as:

(0, 6, 12, ... 174, 180, 181, 182 ... 339, 340.0, 340.1, 340.2 ... 439.9, 440, 441, 442 ... 539, 540, 546, 552 ... 720)

As indicated at block 44, the crankshaft angle array is then stored in the non-volatile memory 24a of μP 24. The stored array is a relative measure of crankshaft rotation, and applies to each of the engine cylinders regardless of their absolute crank angle position.

Figure 5A:
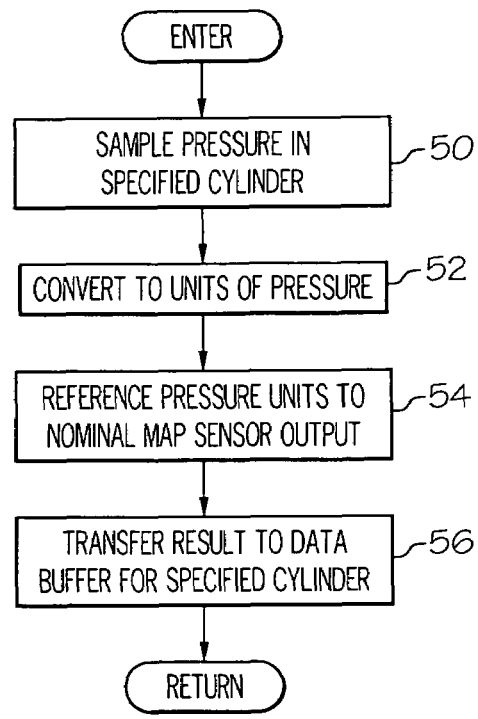
FIG. 5A is a flow diagram representing a software routine executed by the microprocessor-based system of FIG. 1 for acquiring and buffering cylinder pressure data at the scheduled engine crank angles.
Figure 5B:
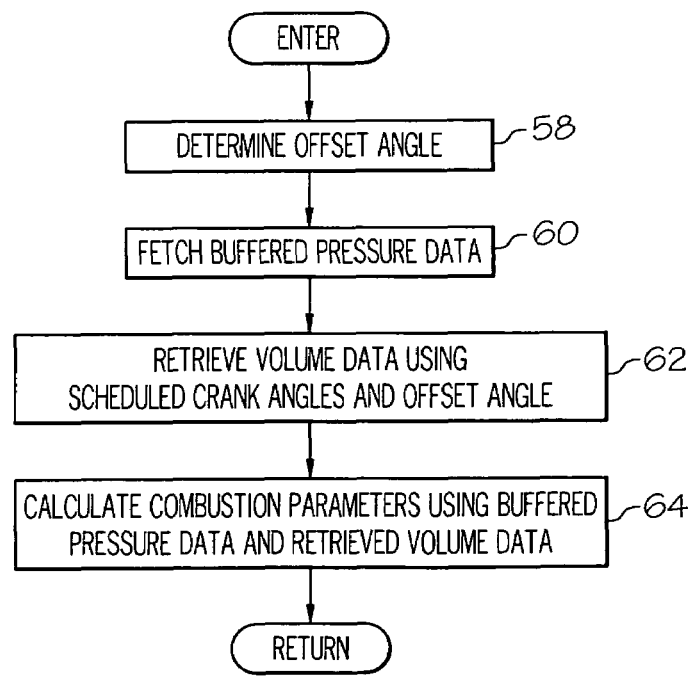
FIG. 5B is a flow diagram representing a software routine executed by the microprocessor-based system of FIG. 1 for determining pressure-based combustion parameters according to this invention.

Referring to FIGS. 5A and 5B, the flow diagram blocks 50-56 and 58-64 represent software routines executed by μP 24 during engine operation to effect calculation in real time of the pressure-based combustion parameters IMEP, PMEP and $Q_{net}$. Blocks 50, 52, 54 and 56 of FIG. 5A represent an interrupt service routine executed at each scheduled crank angle for each cylinder. As indicated at blocks 52-56, each pressure sample is converted to suitable pressure units, referenced or pegged to a nominal reading of the MAP sensor, and transferred to a buffer for the respective cylinder. Blocks 58, 60 and 62 of FIG. 5B represent a routine executed at the end of each combustion cycle of each cylinder for calculating the combustion parameters IMEP, PMEP and $Q_{net}$. For example, the calculation may be timed to occur at the end of the exhaust stroke for each cylinder. In each case, the calculation process involves determining an offset angle (block 58), fetching the buffered pressure data for that cylinder (block 60), retrieving pre-calculated values of V and dV from the non-volatile memory 24a using the scheduled crank angle, as modified by the determined offset (block 62), and calculating the combustion parameters based on the retrieved values of V and dV and the buffered pressure measurements for that cylinder (block 64). The offset angle of block 58 represents a determined misalignment of a given pressure sample with respect to the scheduled crank angle, and is preferably determined by calibration as a function of engine speed. Some sources of misalignment include inaccurate placement or tolerance variations of encoder 16, crankshaft flexure, and signal processing delay. A single offset value can be used for all of the cylinders, or the offset may be determined individually for each cylinder.

The combustion parameter calculations represented by block 64 of FIG. 5B are customized relative to equations (1) and (2) to account for the variable resolution pressure data. Thus, the parameters IMEP and PMEP for a scheduled crankshaft angle $\theta_i$ are calculated according to:

$$IMEP, PMEP = \frac{1}{V_d} \sum_{i=n1}^{n2} P_i \left[\frac{dV}{d\theta}\right]_j spacing_j \qquad (6)$$

where $P_i$ is sampled pressure for crankshaft angle position $\theta_i$, $$\left[\frac{dV}{d\theta}\right]_j$$

is the pre-calculated dV term for the crank angle ($\theta_i$+offset), and $spacing_j$ is the crank angle separation between successive pressure samples (i.e., the pressure measurement resolution). In the case of IMEP, the summation limits n1 and n2 correspond to the compression and power strokes. In the case of PMEP, the summation limits n1 and n2 correspond to the intake and exhaust strokes. The parameter $Q_{net}$ is calculated according to:

$$Q_{net} = \sum_{i=n1}^{n2}\left[\left[\frac{\gamma}{\gamma-1}\right]P_i\left[\frac{dV}{d\theta}\right]_j spacing_j + \left[\frac{1}{\gamma-1}\right]V_j\frac{P_{i+1}-P_{i-1}}{2}\right] \qquad (7)$$

where $V_j$ is the pre-calculated V term for the crank angle ($\theta_i$+offset), and the term [($P_{i+1}-P_{i-1}$)/2] is the average change in pressure over an interval centered about the scheduled crank angle $\theta_i$. The summation limits n1 corresponds to the start of combustion, and may be designated, for example, at the spark plug firing angle (or the fuel injection angle in a diesel engine). The summation limit n2 is the end of combustion, and may be calibrated or determined based on pressure and volume parameters.

In summary, the present invention provides a method of efficiently determining engine cylinder pressure-based combustion parameters such as IMEP, PMEP and $Q_{net}$ in real time during engine operation. While the invention has been described with respect to the illustrated embodiment, it is recognized that numerous modifications and variations in addition to those mentioned herein will occur to those skilled in the art. For example, ECM 20 may be programmed to calculate other combustion parameters such as mass burned fraction (MBF), the combustion cycle regions can be calibrated differently than depicted herein, and so on. Accordingly, it is intended that the invention not be limited to the disclosed embodiment, but that it have the full scope permitted by the language of the following claims.

The invention claimed is:

1. A method of determining a pressure-based combustion parameter for a cylinder of an IC engine, comprising the steps of:
    pre-calculating engine crank angle dependent volume data for said cylinder and storing said volume data as a function of engine crank angle for later retrieval;
    measuring pressure in said cylinder at scheduled engine crank angles during a combustion cycle of said engine;
    retrieving stored volume data for said cylinder based on said scheduled engine crank angles;
    calculating the pressure-based combustion parameter using the measured pressures and the retrieved cylinder volume data; and
    calibrating the scheduled engine crank angles such that a resolution of the pressure measurements has relatively low resolution of pressure measurement during intake and exhaust strokes of the combustion cycle, and relatively high resolution of pressure measurement during the compression and power strokes of the combustion cycle.

2. The method of claim 1, where the pre-calculated engine crank angle dependent volume data includes a volume of said cylinder and a rate of change in volume of said cylinder.

3. The method of claim 1, including the steps of:
    determining an offset corresponding to a misalignment of the pressure measurements relative to respective scheduled engine crank angles; and
    retrieving the stored volume data for said cylinder based on said scheduled engine crank angles, as modified by the determined offset.

4. The method of claim 3, where the engine has multiple cylinders, and offsets are individually determined for each cylinder.

5. The method of claim 3, where said pressure-based combustion parameter is a mean effective pressure in said cylinder, calculated according to:

$$\frac{1}{V_d}\sum P_i\left[\frac{dV}{d\theta}\right]_j spacing_j$$

where $\theta_i$ is a scheduled crank angle, $V_d$ is a displaced volume of said cylinder, $P_i$ is a cylinder pressure measured at scheduled crank angle $\theta_i$, $$\left[\frac{dV}{d\theta}\right]_j$$

is the retrieved cylinder volume data for a crank angle ($\theta_i$+offset), and $spacing_j$ is a crank angle separation between successive cylinder pressure measurements.

6. The method of claim 3, where said pressure-based combustion parameter is a net heat release energy in said cylinder, calculated according to:

$$Q_{net} = \sum \left[ \left[ \frac{\gamma}{\gamma-1} \right] P_i \left[ \frac{dV}{d\theta} \right]_j \text{spacing}_j + \left[ \frac{1}{\gamma-1} \right] V_j \frac{P_{i+1} - P_{i-1}}{2} \right]$$

where $\gamma$ is a ratio of specific heats $c_p$ and $c_v$, $\theta_i$ is a scheduled crank angle, $P_i$ is a cylinder pressure measured at scheduled crank angle $\theta_i$, $\left[ \frac{dV}{d\theta} \right]_j$ and $V_j$ are the retrieved cylinder volume data for a crank angle ($\theta_i$+offset), spacing$_j$ is a crank angle separation between successive cylinder pressure measurements, and $[(P_{i+1}-P_{i-1})/2]$ is an average change in measured cylinder pressure over an interval centered about the scheduled crank angle $\theta_i$.

* * * * *